Jan. 7, 1930.　　　W. H. KOTHMAN　　　1,742,545

STERILIZER

Filed Sept. 12, 1928

Inventor
Wesley H. Kothman

By Hardway Mathes
Attorneys

Patented Jan. 7, 1930

1,742,545

UNITED STATES PATENT OFFICE

WESLEY H. KOTHMAN, OF CASTELL, TEXAS

STERILIZER

Application filed September 12, 1928. Serial No. 305,464.

This invention relates to new and useful improvements in a sterilizer.

One object of the invention is to provide an implement of the character described, specially designed for the purpose of sterilizing male animals.

Another object of the invention is to provide an implement of the character described whereby the animal may be rendered sterile without any considerable mutilation and without any considerable loss of blood or injury to the animal.

With the above and other objects in view, the invention has particular relation to certain novel features of construction, operation and arrangement of parts an example of which is given in this specification and illustrated in the accompanying drawings, wherein:—

Figure 1:
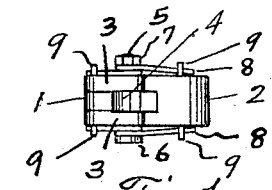
Figure 1 shows an end view of the implement.
Figure 2:
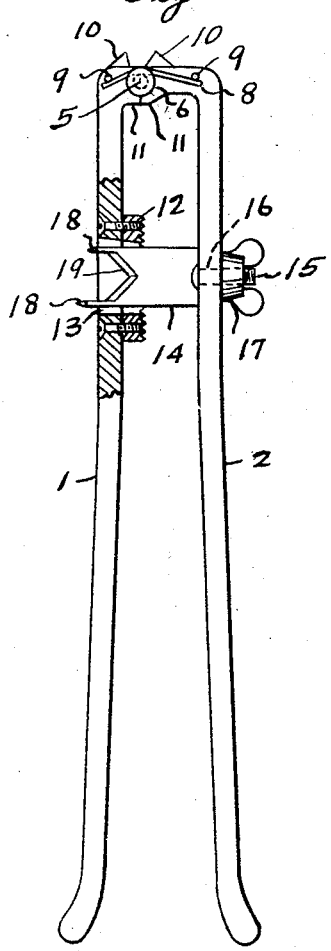
Figure 2 shows a side view thereof partly in section, in closed position.
Figure 3:
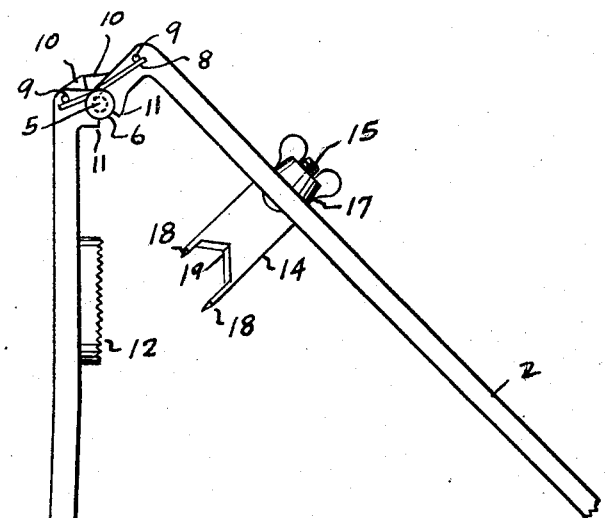
Figure 3 shows a side view thereof, in open position.
Figure 4:
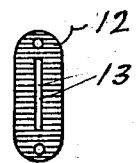
Figure 4 shows a plan view of the jaw employed.

Referring now more particularly to the drawings, wherein like numerals of reference designate similar parts in each of the figures, the numerals 1, 2, designate the handles. At one end these handles are over turned at substantially right angles and the over turned end of the handle 1, is bifurcated forming the fingers 3, 3 and the over turned end of the other handle has a tenon 4 which fits between the fingers 3. These fingers and the tenon have aligned bearings to receive the pin 5 on which they are pivoted said pin having a head 6 at one end and a nut 7 screwed unto the other end to retain the pin in place. Springs 8, 8 are coiled around the respective ends of the pin 5, each spring having its ends engaged behind the pins 9, 9, carried by the respective handles, said springs thus operating to normally hold the handles in open position. Said handles are limited in their movement by the opposing outside and inside shoulders 10, 10 and 11, 11 arranged to abut and to limit such movement in either direction.

The handle 1 has an oblong jaw 12 secured to its inner side whose inner face is toothed and this jaw, and the corresponding handle have an oblong blade slot 13, cut therethrough. There is a long blade 14 one end of which is formed with an outwardly threaded shank 15 which is fitted through a bearing 16 in the handle 2 and a wing nut 17 is threaded onto said shank and when screwed home, holds the adjacent end of the blade 14 in abutting relation with the handle 2 and the blade may be adjusted by loosening said nut so that it will align perfectly with the slot 13. At the free end of the blade there are the spaced, sharp tangs 18, 18 and between them the blade is formed with a V-shaped edge 19.

In use the implement is so applied that the testis cord will extend transversely across the jaw 12, and slot 13, and the handles are then forced together, the tangs 18 piercing the flesh on opposite sides of said cord and the cutting edge 19 operating to sever said cord and the blood vessel feeding the corresponding testis gland. This operation serves to render said gland sterile without appreciably mutilating the animal and with very little pain or loss of blood.

While I have shown what I now consider to be the preferred form of the invention it is obvious that mechanical changes may be made therein, and equivalents substituted for the parts shown and I reserve the right to make such changes and substitutions as may be comprehended within the principle of the invention.

What I claim is:—

1. A sterilizing implement comprising a pair of handles pivoted together at one end and one of which has a blade slot, a blade attached to the other handle and adapted to work through said slot.

2. A sterilizing implement comprising two handles pivoted together, at one end, a jaw attached to the inner side of one handle, said jaw and handle having a blade slot, a blade attached to the other handle, and adapted to work through said slot, 3. A sterilizing implement comprising a pair of handles pivoted together at one end and one of which has a blade slot, a blade attached to the other handle and adapted to work through said slot, the free end of the blade having spaced tangs and a cutting edge between the tangs.

4. An implement of the character described comprising two handles pivotally connected together, cooperating means carried by the jaws adapted to sever an object between them, said means being characterized by the provision of a blade having spaced tangs, and a cutting edge between the tangs.

5. A sterilizing implement comprising a pair of handles pivoted together at one end, one of which has a blade slot, a blade attached to the other handle and adapted to work through said slot, and means for limiting the range of movement of the jaws toward and from each other.

6. A sterilizing implement comprising a pair of handles pivoted together at one end and one of which has a blade slot, a blade attached to the other handle and adapted to work through said slot, and yieldable means normally holding the handles in open position.

In testimony whereof I have signed my name to this specification.

WESLEY H. KOTHMAN.